United States Patent Office
3,412,079
Patented Nov. 19, 1968

3,412,079
PROCESS OF POLYMERIZING CONJUGATED DI-
OLEFINS BY CONTACTING SAME WITH A CAT-
ALYST COMPRISING A COMPLEX OF A LITH-
IUM HYDROCARBON WITH A FERROCENE
Adel F. Halasa, Akron, and Harold E. Adams, Cuyahoga
Falls, Ohio, assignors to The Firestone Tire & Rubber
Company, Akron, Ohio, a corporation of Ohio
No Drawing. Filed Feb. 1, 1966, Ser. No. 523,887
6 Claims. (Cl. 260—94.3)

ABSTRACT OF THE DISCLOSURE

Conjugated diolefins are polymerized in the presence of catalysts comprising compounds of the formula

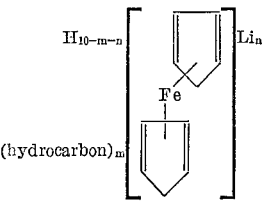

wherein
$m$ is an integer from 0 to 3
$n$ is an integer from 1 to $(8-m)$
and
(hydrocarbon) indicates a hydrocarbon group containing up to 10 carbon atoms The resulting polymers are characterized by excellent green strength and building tack, broad molecular weight distribution, high cis-1,4 structure, desirable microgel content, and by the excellent properties of vulcanizates made therefrom.

---

This invention relates to the polymerization of conjugated diolefins.

In recent years there have been developed processes for the polymerization of conjugated diolefins using catalysts based upon lithium, i.e., lithium metal or compounds of lithium in which the lithium is sufficiently active to displace hydrogen from water, e.g. hydrocarbon lithiums and the like. These catalysts produce polymers which are high in the desirable cis-1,4 structure, and which yield excellent rubbery vulcanizates. However, particularly where it is desired to obtain the highest possible cis-1,4 structure, the catalysts must be employed in extremely small quantities, which leads to difficulties of control, since greater or lesser amounts of the unavoidably variable trace impurities in the monomers, solvent and other components of the system will produce a disproportionate disturbance in a low-catalyst system. Likewise the polymers leave something to be desired in green strength. In unvulcanized state, these polymers tend to lack the mechanical strength requisite for processing and fabricating operations necessarily carried out thereon prior to vulcanization. Typically, the maximum stress which the unvulcanized materials will exhibit during deformation is rather low, occurs at an early stage in the deformation, and, moreover, drops off quite rapidly as the deformation continues beyond the point at which maximum stress is exhibited. Unvulcanized strips or other preforms are apt to pull apart taffy-wise during building etc. operations carried out thereon.

Another characteristic in which these polymers leave something to be desired is the matter of building tack. In the construction of tires and other manufactured articles, it is frequently necessary to assemble components of uncured rubbery material together, making use of their natural autoadhesion or building tack.

The deficiencies of these polymers discussed above appear to be connected in some way with the narrow molecular weight range and absence of microgel (gel particles small enough so as not to interfere with the processabiilty of the polymers) characteristic of these polymers.

Accordingly it is an object of this invention to provide a novel and improved process for the polymerization of conjugated diolefins making use of lithium catalysis.

Another object is to provide such a process which is readily and reproducibly controllable.

A further object is to provide such a process which will result in polymers having desirable green strength characteristics.

A further object is to provide such a process which will result in polymers having good building tack.

A still further object is to provide such a process which will produce polymers having a wider molecular weight distribution, and an enhanced microgel, as compared with polymers of this type heretofore produced.

Synopsis of the invention

The above and other objects are secured, in accordance with this invention, by polymerizing conjugated diolefins, or mixtures therewith with other olefinically unsaturated compounds copolymerizable therewith, in the presence of a catalyst comprising the reaction product of a lithium hydrocarbon compound with ferrocene in the mole ratio of carbon-bound lithium: ferrocene in the range of 1:1 to 10:1. The process is much less disturbed by impurities in the polymerization system, than has been the case with hydrocarbon lithium and other lithium-based catalysts heretofore employed. The polymeric products are characterized by excellent green strength and building tack, and by desirable fundamental properties, viz. broad molecular weight distribution, high cis-1,4 structure, and desirable microgel content, as well as excellent vucanizate properties after vucanization by sulfur/accelerators with any of the known vulcanization systems.

The monomers to be polymerized

These may be any of the conjugated diolefins containing up to six carbon atoms, or mixtures thereof with each other with lesser proportions (say up to 30%, based on the total weight of monomers) of other unsaturated compounds copolymerizable therewith. Examples of suitable conjugated diolefins include, for instance butadiene, isoprene, 2,3-dimethyl butadiene, piperylene, 1,2-dimethyl butadiene, and the like. Other monomers which may be copolymerized with the conjugated diolefins include the vinyl substituted benzenes such as styrene, alpha-methyl styrene, o-, p- and m-methyl and ethyl-substituted styrenes, allene, vinyl naphthalene, acrylonitrile, methacrylonitrile, acrylate esters, methacrylate esters, amides, etc. and the like.

These should be used in minor amounts, say not more than 30%, based on the total weight of the conjugated diolefins and comonomers, so as to leave intact the essential polydiolefin character of the polymeric products.

The lithium hydrocarbon-ferrocene reaction products

These may be prepared by reacting together, in a suitable inert organic medium, a hydrocarbon lithium compound with ferrocene or hydrocarbon-substituted ferrocene in mole ratios of carbon-bound lithium: ferrocene of 1:1 to about 10:1 and preferably 2:1 to 8:1. The hydrocarbon substituted ferrocene may be any in which the cyclopentadiene rings contain up to 3 hydrocarbon groups replacing hydrogens on the rings, each hydrocarbon group containing up to 10 carbon atoms. Suitable ferrocene-type compounds for the reaction include for instance ferrocene itself, and hydrocarbon-substituted ferrocenes such as methyl ferrocene, ethyl ferrocene, octyl ferrocene, bridged ferrocenes such as the indene-ring homolog of ferrocene, viz. benzoferrocene, methyl ethyl ferrocene, phenyl ferrocene, benzyl ferrocene and the like. Suitable hydrocarbon lithium compounds include, for instance, any hydrocarbons containing up to 40 carbon atoms in which one or more hydrogen atoms have been replaced by lithium atoms such as ethyl lithium, butyl lithium, dodecyl lithium, tetramethylene dilithium, pentamethylene dilithium, phenyl lithium, benzyl lithium, and the like. The reaction has not been fully elucidated, but it appears that the lithium in the hydrocarbon lithium compound replaces one or more hydrogen atoms of the ferrocene, the hydrogen so displaced combining with the hydrocarbon radical to form the free hydrocarbon. The reaction may be written thus, for the replacement of a single hydrogen atom by the action of butyl lithium:

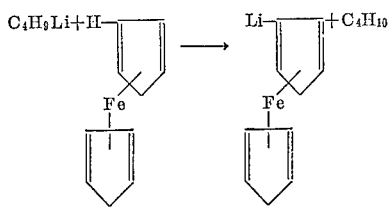

It will be understood that more than one hydrogen of the ferrocene may be replaced in this way, up to a total of about four hydrogen atoms per ring or eight hydrogen atoms for the entire molecule of ferrocene.

The unsubstituted ferrocene molecule contains ten hydrogen atoms, of which eight may be replaced by lithium. Assuming that $m$, an integer from 0 to 3, is the number of hydrogens that have been replaced by hydrocarbon groups, then $(8-m)$ is the number of hydrogens available for replacement by lithium, and $8-m=n$ will be the maximum number of lithium atoms in the final reaction product. On this basis, the formula of the reaction product is

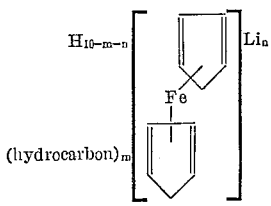

wherein $m$ is an integer from 0 to 3
$n$ is an integer from 1 to $(8-m)$ and (hydrocarbon indicates a hydrocarbon group containing up to 10 carbon atoms.

The reaction takes place relatively slowly at ordinary temperatures, being completed over the course of several days. The reaction is temperature-dependent and more rapid reactions can be obtained at slightly higher temperatures. The reaction product takes the form of a precipitate which settles out of the reaction mass. It is understood it would not be strictly necessary to wait for the completion of the reaction; the precipitated reaction product begins to form almost at once, and can be removed and used as a catalyst even though the remainder of the reaction mixture has not reacted. Generally, the reaction is carried out at temperatures in the range of 5° to 100° C. It will usually be most convenient to allow the reaction to go to completion, so that no unreacted butyl lithium remains in solution, and to use the whole preparation as a catalyst. As noted above, the reaction is carried out in an inert organic solvent, usually in an amount such that the ferrocene will constitute from .001% to 75% of the sum of the weights of the solvent and ferrocene. Suitable inert organic solvents are exemplified in hydrocarbons containing up to 40 carbon atoms, or preferably up to 16 carbon atoms such as paraffins on the order of propane, butane, hexane, cyclohexane, methyl cyclohexane, heptane, petroleum ether, kerosene, diesel oil, or the like, or aromatic hydrocarbons such as benzene, toluene, the several xylenes, hydrogenated aromatics such as tetralin, decalin, and the like.

*The polymerization procedure*

The polymerization may be carried out in bulk, in the absence of any solvent, or in solution in a solvent such as suggested above for the preparation of the catalyst. Usually, sufficient pressure is applied to keep the greater part of the conjugated diolefin in the liquid phase, although the polymerization may be carried out with the conjugated diolefin in the gaseous phase. The polymerization is carried out by contacting the monomeric material, i.e., the diolefins or mixtures thereof together with any monomers to be copolymerized therein, either in bulk or in solution in a solvent, with the catalyst prepared as described above, at temperatures on the order of $-20°$ C. to $+150°$ C., preferably $+25°$ C. to $+85°$ C.

As to the amount of catalyst to be used, in general, the larger the amount of catalyst used, the more rapidly the polymerization will proceed. Countervailing this desirable effect, high concentrations of catalysts tend to lower the molecular weight of the polymers and also alter the microstructure of the polymeric chains. Based on these considerations, the amount of catalyst employed should be such as to contain not more than 0.1 gram, and preferably not more than 0.02 gram, of carbon-linked lithium, expressed as metallic lithium, per 100 grams of isoprene in the polymerization mixture. There appears to be no theoretical lower limit to the amount of catalyst used; at low concentrations, the catalysts appear to have a high order of efficiency, i.e., if the reaction environment is scrupulously purged of all contaiminants such as oxygen, ozone, water, carbon dioxide, etc., which would react with and consume the catalyst, the catalyst appears to be used princapally in the production of polymer chains so that, as long as any catalyst is present, some degree of polymerization will take place. For economic reasons of obtaining a rapid reaction rate and optimum reactor utilization, it is preferred to have at least 0.00002 gram of carbon-bonded lithium present per 100 grams of isoprene. The above concentrations are, of course, expressed on the basis of catalyst effectively present in the polymerization mass; if substances which will react with and destroy the catalyst are permitted to enter the reaction zone, the amount of catalyst so destroyed must be subtracted from that supplied in applying the above criteria.

For the purpose of establishing the effective concentration of carbon-linked lithium in any catalyst preparation employed in the practice of this invention, the differential titration technique of Gilman and Haubein J. Am. Chem. Soc. 66; 1515 (1944) has been found the most suitable procedure, and the concentrations referred to hereinabove and in the claims are to be applied on the basis of analyses made by this method, if any question arises on this point. For most practical purposes, where side reactions are not suspected, simple titration with acid will give reasonably accurate results.

The monomeric material may be dissolved in any of the solvents mentioned above as suitable vehicles for the preparation of the catalyst itself. The concentration of monomers is most conveniently kept in the range of 3% to 15% by weight of the entire polymerization mass, as the materials are most readily handled in this range. However, this is not critical, and higher or lower concentrations may be employed. The system preferably should be kept free as possible from oxygen and/or oxygenated or nitrogenous compounds such as water, ethers, ketones, esters, amines and the like, as these compounds tend to react with and destroy the catalyst, and if present in amounts in excess stoichiometrically in relation to the catalyst, will increasingly diminish the cis-1,4 configuration of the polymeric products. The polymerization should be carried out in such a manner as to insure thorough contact of the catalyst and monomers, and effective removal of heat; for instance, with small scale operations, in glass bottles which are tumbled, at least initially to effect mixing; or on a large scale, in autoclaves provided with rotary agitators and cooling jackets. After the polymerization has proceeded to the desired extent, the polymer may be recovered from the solution by any suitable means, for instance my injection into hot water, which will flash off the solvent or any unreacted monomers, leaving the polymer as crumbs dispersed in the water; or by drying on a drum or extruder dryer; or by mixing the solution with a non-solvent for the polymer, such as methanol, isopropyl alcohol or the like to precipitate the polymer.

One of the advantages of the present invention is its lesser sensitivity to variations in catalyst concentration, and to impurities in the system. In order to secure optimum polymer structure and desirable molecular weight, it is necessary, with the simple hydrocarbon lithium catalysts, to employ these in very low concentrations, at which concentrations small amounts of impurities exert a disproportionate destructive and/or modifying action thereon. The present catalysts may be used in larger amounts to achieve the same excellent polymer properties and are, moreover, less sensitive to impurities; and a less scrupulous control and monitoring of catalyst concentrations in relation to monomer and solvent impurities may be observed without unduly affecting the process and product.

The polymeric products

The products of the process of the invention are characterized by high and reproducible molecular weight, and excellent microstructure, in optimum cases having cis-1,4-contents, as reflected by infra-red measurements, on the order of 94.0+%. Moreover the products appear to be characterized by lesser amounts of unidentifiable structures, as reflected by higher values for "total found" figures obtained on such measurements. The products also appear to have a wider dispersion of molecular weights, as compared to polymers hitherto prepared from lithium-based catalysts. These differences in fundamental structure are reflected in the improved technical properties of the products of this invention. Earlier polymers have been somewhat deficient in "building tack," i.e., self-adhesiveness in the unvulcanized state which enables plies of the polymers to be built up into uncured preforms; and in "green strength"—upon the deformation of the unvulcanized materials, the stress increases up to a certain point, the "maximum stress," at a rather early point in the deformation, and thereafter decays rapidly upon further deformation. The polymers produced in accordance with the present invention have much improved tack, and exhibit a much improved unvulcanized "green strength," in comparison with previous lithium polymers.

Evaluation of the polymers

In the examples hereinafter, various analyses and tests are conducted upon the polymeric products to determine the cis-1,4, trans-1,4, 1,2- and 3,4-structures in the polymer. With regard to the infra-red analyses, the relative amounts of the four structures named are found by measuring the intensities of the infra-red absorption bands at 8.85, 8.68, 10.98 and 11.25 microns for the four types of structures, in the order given above, and inserting these values into the equation:

$$D^i = e_1^i c_1 + e_2^i c_2 + e_3^i c_3 + e_4^i c_4$$

where $D^i$ = absorbance (optical density) of the polymer at wavelength $i$ $e^i_{1,2,3,4}$ = the absorptivities of the several structures at wavelength $i$, the subscripts 1, 2, 3 or 4 referring to the several component structures and $C_{1,2,3 \text{ or } 4}$ = the concentrations of the several structures, the subscripts 1,2,3 or 4 referring to the several component structures.

The four equations obtained in this way were solved for $C_1$, $C_2$, $C_3$ and $C_4$, the values of the concentrations of the cis-1,4-, trans-1,4-; 1,2-addition and 3,4-addition of the polymer.

The peak wavelengths selected, and the values of the absorptivities $e^i$ for these wavelengths for the several structures, are tabulated herewith:

| | Molar Absorptivities $e^i$ at Wavelength of— | | | |
|---|---|---|---|---|
| | 8.68 microns | 8.85 microns | 10.98 microns | 11.25 microns |
| Structure: | | | | |
| 1,2-addition | 3.0 | 3.0 | 149.0 | 9.0 |
| 3,4-addition | 1.5 | 2.0 | 7.0 | 145.0 |
| Cis-1,4-addition | 3.583 | 6.518 | 1.860 | 1.530 |
| Trans-1,4-addition | 5.927 | 1.934 | 2.277 | 1.885 |

In the detailed examples given hereinafter, percentage values are given for the various types of unsaturation. These are derived by dividing the absolute concentration of each type of unsaturation by the sum of the concentrations of the four types of unsaturation (1,2-; 3,4-; cis- and trans-) determined, and multiplying by 100%, so that the sum of the percentages given will always be 100%. In order to assess the accuracy of the determintion, a further figure is given, namely total unsaturation found, hereinafter abbreviated "T.F." This is the quotient of the sum of the concentrations of the various types of unsaturation found by infra-red analysis, divided by the theoretical concentration of all unsaturation which should be present in the sample, assuming, for example, that the polyisoprene is constituted solely of

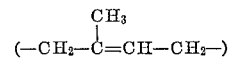

units.

Gel and dilute solution viscosity were also determined as follows.

Determination of gel and dilute solution viscosity (hereinafter abbreviated "DSV") on polybutadiene and polyisoprene polymers Apparatus:

(a) 125 ml. flasks
(b) CP or redistilled toluene
(c) 5, 10, 25 and 50 ml. pipettes and 100 ml. graduates
(d) 100 mesh, conical, steel screens, aluminum cups, and Reeve Angel filter paper, No. 802
(e) Constant temperature bath equipped with a thermometer reading to tenths of a degree and a stirrer
(f) A timer reading to tenths of a second
(g) A No. 50 Ostwald viscometer.

Procedure (a) If the dilute solution viscosity is thought to be around 6.0–7.0 or lower, accurately weigh 0.4000 g. polymer. If the dilute solution viscosity is thought to be 6.0–7.0 or higher, accurately weigh 0.2000 g. polymer. The polymer should be unmilled and finely cut. Place the sample in a 125 ml. Erlenmeyer flask and cover with exactly 100 ml. C.P. or redistilled toluene which contains 0.0075 g. phenyl beta-naphthylamine per liter. Swirl gently to separate the particles.

(b) Set the flask in a dark place. Several hours later swirl again to remove polymer from the bottom of the flask. Twenty-four hours later shake again making sure all the polymer is removed from the bottom of the flask. A neoprene policeman may be necessary to accomplish this. Take care that no polymer remains on the policeman. Allow to stand for about an hour.

(c) Filter the liquid through a screen and/or the filter paper depending upon the gel present. Weigh an aluminum cup.

(d) Pipette a 10 ml. aliquot of the filtered solution into the aluminum cup and evaporate to dryness on a hot plate at 100° C.–110° C. Place in a hot air oven at 100° C. for an hour. Cool for a few minutes and weigh. This weight will be needed to calculate gel content and dilute solution viscosity.

(e) For dilute solution viscosity, adjust the constant temperature bath to 25° C.±0.1° C.

(f) Rinse a clean No. 50 Ostwald viscometer two or three times with C.P. or redistilled toluene to which has been added 0.0075 g. phenyl beta-naphthylamine per liter. Drain the viscometer as dry as possible without the use of a vacuum line and place in the constant temperature bath. Pipette 5 ml. of toluene plus phenyl beta-naphthylamine into the large arm of the Ostwald viscometer.

(g) Draw the solvent above the second blue mark on the small arm of the viscometer. Measure the time it takes the solvent to flow between the two marks on the viscometer. The flow time of two runs should check within 0.2 sec.

(h) Dilute the polymer solution to a concentration so that the ratio of the flow time of the polymer solution to the flow time of the solvent is between 1.1 and 1.5. In high molecular weight polymers the concentration may have to be as low as 0.0150 g./100 ml. The concentration of the solution in grams/100 ml. is necessary in the final calculation of dilute solution viscosity.

(i) Pipette about 5 ml. of the polymer solution into the large arm of the viscometer. Draw the solution up through the capillary to rinse out the solvent. Drain the viscometer. Pipette 5 ml. of the polymer solution into the viscometer and measure the flow time as described above.

*Information needed for calculation of gel and dilute solution viscosity*

1. Weight of sample (0.2000 g. or 0.4000 g.)
2. Weight of aluminum cup
3. Weight of aluminum cup and residue of 10 ml. aliquot of polymer solution
4. Concentration of dilute polymer solution in g./100 ml.
5. Flow time in seconds of the solvent
6. Flow time in seconds of the solution

*Calculations involved*

$$\% \text{ Gel} = \frac{\text{Original wt.} - 10 \times \text{wt. of residue of polymer solution}}{\text{Original Wt.}} \times 100$$

Dilute Solution Viscosity=

$$\frac{2.303 \times \log \left( \frac{\text{flow time in seconds of solution}}{\text{flow time in seconds of solvent}} \right)}{\text{concentration in g./100 ml.}}$$

Values for "building tack" given hereinbelow were determined as follows. There was provided a cylinder two inches in diameter by two inches in length mounted to rotate to the upper, tension-measuring, head of a tensile testing machine (Instron Model TTG). The unvulcanized composition to be tested was sheeted out to a thickness of 1/16 inch, and placed on a holland cloth liner. A one-inch wide strip, together with its liner, was cut out and wrapped around the cylinder, rubber side out. A similar strip was cut out and wrapped around the first strip, with the rubber faces in contact and a tail of the strip hanging free. This tail was attached to the lower jaw of the testing machine. The machine was then set in operation, with the lower jaw retreating from the upper at a rate of two inches per minute. The maximum tensile force, in pounds, shown on the measuring head was recorded as the "building tack" of the compound.

With the foregoing general discussion in mind, there are given herewith detailed specific examples of the execution of this invention.

A. Preparation of Catalyst

Benzene _____ 300 ml.
 (distilled over sodium)
Ferrocene _____ 20 g. (0.1 mol).
Butyl lithium solution (in heptane,
 containing .011368 g. of lithium
 per ml.) _____ 250 ml.
  (0.4 mol of Li).

The above ingredients were charged into a 32-ounce beverage bottle, which was then flushed with argon, and sealed with a neoprene-lined crown cap provided with a perforation for withdrawal of the contents by hypodermic syringe. The bottle was swirled to mix the contents and placed in a water bath at 70° C. for 6 days. During the course of this time a precipitate formed which was readily re-suspendible by shaking the bottle. An analysis of the suspension showed .00254 gram-atom of carbon-bound lithium per ml. and .00461 total alkalinity per ml., calculated as gram-atoms of lithium. This suspension was used as the catalyst in the polymerization experiments to follow, and will hereinafter be designated "Catalyst suspension A."

EXAMPLE I.—BULK POLYMERIZATION

Isoprene _____ Ca 200 g.,
  per Table I.
Catalyst suspension A _____ 12 or 13 ml.
  per Table I.

Two runs were made in accordance with the foregoing recipe. In each run a tared 28-ounce beverage bottle was baked at 250° C. for 24 hours, then cooled while flushing with nitrogen. The bottles were then filled with isoprene, and, with continued nitrogen flushing, warmed on a sand bath to boil off a large portion of the isoprene so as to insure removal of all dissolved nitrogen. The bottle was then capped with a perforated, neoprene-lined crown cap, and hypodermically pressurized with nitrogen. The bottle was then re-weighed to determine the amount of isoprene therein. The bottle was then cooled to 0° C., opened briefly to inject the catalyst, re-pressurized, and re-sealed with a silver-lined crown cap. The bottle was then swirled to mix the contents, and kept in a polymerization box at 8° C. for a duration of time indicated for the run in Table I. At the end of this time, the bottle was cut open and the contents dumped into methanol containing 1% of phenyl-beta-naphthylamine. The polymer was then dried in a vacuum oven. Set forth herewith in Table I are particulars of the runs and properties of the products.

TABLE I

| Run No. | Isoprene (grams) | Catalyst Suspension (ml.) | Polymerization Time (hr.) | Conversion (percent) | Properties of Product | | | | | |
|---|---|---|---|---|---|---|---|---|---|---|
| | | | | | DSV | Gel (percent) | Infra-red Analysis (percent) | | | |
| | | | | | | | Cis-1,4 | Trans-1,4 | 1,2- | 3,4- | TF |
| 1 | 213 | 12 | 72 | 21.3 | 14.5 | 0 | 94.1 | 0.0 | 0.0 | 5.9 | 84.8 |
| 2 | 225 | 13 | 72 | 19.5 | 15.0 | 0 | 94.2 | 0.0 | 0.0 | 5.8 | 90.5 |
| 3 | ¹ 200 | 12 | 24 | 19.5 | 16.1 | 0 | 94.1 | 0.0 | 0.0 | 5.9 | 90.5 |
| 4 | 200 | 16 | 24 | 10.0 | 7.4 | 0 | 93.9 | 0.0 | 0.0 | 6.1 | 90.1 |

¹ In this run, after sealing in the catalyst was quickly dropped into a bucket of water at about 15° C., and allowed to react to about 20% conversion. The bottle was then transferred to a water bath at 24° C. to complete the polymerization.

EXAMPLE II

Solution polymerization—variation of catalyst and monomer concentrations

A series of runs was made, using solutions of isoprene in hexane of various concentrations, and various amounts of catalyst A, as set forth in Table II below. In each run a baked and cooled beverage bottle was filled with the selected amount of isoprene-hexane solution, and placed on a sand bath to boil off a portion of the isoprene so as to purge any dissolved oxygen. While the isoprene was still boiling, the desired amount of catalyst A was injected, and the bottle then sealed with a silver-lined crown cap. The bottle was then swirled to mix the contents, and placed in a polymerizing cabinet for a duration of time, and at a temperature, set forth for the run in Table II. The polymers were recovered as described in Example I. Following are the particulars of the several runs.

TABLE II

| Run No. | Preparation of Polymer ||||| Properties of Polymer ||||||||| Unvulcanized Properties |||||
|---|---|---|---|---|---|---|---|---|---|---|---|---|---|---|---|---|---|
| | Isoprene ||| Catalyst Suspension (ml.) | Polymerization Conditions || Percent Conversion | Infra-red Analysis (percent) |||| Total Found | DSV | Gel (percent) | Tack | Max. Init. Peak Stress | Stress at Break (p.s.i.) | Elongation (percent) |
| | Orig. Conc. of Soln. (percent) | Grams of Soln. | Grams of Isoprene | | Time (hr.) | Temp. (°C.) | | Cis-1,4 | Trans-1,4 | 1,2- | 3,4- | | | | | | | |
| 1 | 5 | 600 | 30.0 | 15 | 48 | 35 | 100 | 94.5 | 0.0 | 0.0 | 5.5 | 93.0 | 29.0 | 0.0 | 21.0 | 2.10 | 1.20 | 1,800 NB.[1] |
| 2 | 10 | 600 | 55.80 | 8 | 12 | 35 | 93 | 94.4 | 0.0 | 0.0 | 6.3 | 88.9 | 18.0 | 0.0 | 20 | 2.45 | 1.40 | 1,800 NB. |
| 3 | 10 | 600 | 55.80 | 10 | 12 | 35 | 93 | 93.7 | 0.0 | 0.0 | 5.8 | 90.0 | 24 | 0.0 | 17.8 | 2.10 | 1.10 | 1,750. |
| 4 | 10 | 600 | 60.0 | 12 | 12 | 35 | 100 | 94.1 | 0.0 | 0.0 | 5.9 | 91.0 | 23 | 0.0 | 17.8 | 2.10 | 1.10 | 1,750. |
| 5 | 10 | 600 | 60.0 | 15 | 12 | 35 | 100 | 94.2 | 0.0 | 0.0 | 5.9 | 92.0 | 22 | 0.0 | 19.3 | 2.20 | 0.90 | 1,800. |
| 6 | 15 | 160 | 25 | 1.0 | 48 | 50 | 58.8 | 93.7 | 0.0 | 0.0 | 6.3 | 86.1 | 23.8 | 20.0 | 13.6 | 2.4 | 0.5 | 1,500. |
| 7 | 15 | 160 | 25 | 1.5 | 12 | 50 | 42.7 | 93.8 | 0.0 | 0.0 | 6.2 | 86.0 | 19.0 | 20.0 | 14.2 | 2.3 | 0.5 | 1,500. |
| 8 | 15 | 160 | 25 | 2.0 | 48 | 50 | 61.6 | 93.8 | 0.0 | 0.0 | 6.2 | 88.5 | 23.2 | 32.5 | 11.2 | 2.3 | 0.5 | 1,370. |
| 9 | 15 | 160 | 25 | 2.5 | 20 | 50 | 73.5 | 93.8 | 0.0 | 0.0 | 6.4 | 89.0 | 18.7 | 10.0 | 20.0 | 2.3 | 0.95 | 1,000 NB. |
| 10 | 15 | 160 | 25 | 3.0 | 20 | 50 | 78.5 | 93.6 | 0.0 | 0.0 | 6.4 | 88.5 | 22.2 | 10.0 | 14.0 | 2.2 | 1.60 | 1,800 NB. |
| 11 | 15 | 160 | 25 | 3.5 | 20 | 50 | 78.8 | 93.9 | 0.0 | 0.0 | 6.1 | 90.0 | 22.0 | 7.5 | | 2.45 | | 1,800 NB. |
| 12 | 20 | 400 | 80 | 6.0 | 48 | 35 | (²) | 94.4 | 0.0 | 0.0 | 5.6 | 90.3 | 21.0 | 20 | 20 | 2.45 | 1.60 | 1,800 NB. |
| | 20 | 400 | 80 | 7.0 | 48 | 35 | | | | | | | | | | | | |
| 13 | 20 | 400 | 80 | 9.0 | 72 | 35 | 60.0 | 94.4 | 0.0 | 0.0 | 5.6 | 91.0 | 23 | 12 | 15.2 | 2.20 | 1.2 | 1,800 NB. |
| 14 | 50 | 200 | 100 | 4.0 | (²) | 8-24 | 64.0 | 94.1 | 0.0 | 0.0 | 5.9 | 92.0 | 25 | 14 | 19.1 | 3.30 | 0.5 | 980. |
| 15 | 50 | 200 | 100 | 8.0 | 72 | 24 | 63.0 | 94.2 | 0.0 | 0.0 | 5.8 | 90.0 | 26 | 15 | 19.1 | 2.5 | 2.4 | 1,800 NB. |
| Control[3] | 50 | 200 | 100 | 12.0 | | | | | | | | | | | 3.0 | 2.1 | 1.0 | 500. |

[1] "NB" signifies no break at elongation indicated.   [2] Products of this and following two runs blended for test.   [3] A commercial polyisoprene "Shell HC6" manufactured by the Shell Oil Company.

CATALYST PREPARATIONS
(For Examples III–V)

Ferrocene (.05 mole) _____ g__ 9.3
Butyl lithium solution (in hexane, contains .01098
 g. of carbon-bound lithium per ml.) (.05, 1.0,
 1.5 or 2.0 moles) _____ ml__ 31.6–126.8
Hexane, q.s. to make 130 ml.

A series of four preparations was made in accordance with the foregoing schedule, using .05, 1.0, 1.5 or 2.0 moles of butyl lithium in the respective preparations, so as to provide lithium: ferrocene mole ratios of 1:1, 2:1, 3:1 and 4:1, each solution being .375 molar in monoatomic iron. Hereinafter these preparations will be designated respectively as catalysts B1, B2, B3 and B4. In each preparation, the ingredients were loaded into a baked beverage bottle, which was flushed with argon and sealed with a neoprene-lined crown cap provided with a perforation for hypodermic withdrawal of the contents. The bottle was swirled to mix the contents and placed in a water bath at 50° C. for 60 hours. During this time a precipitate formed which redispersed readily upon agitation.

Example III.—Butadiene polymerization

Hexane _____ grams__ 88.2
Butadiene _____ do____ 35.7
Catalyst B–4 (Li, Fe=4:1) _____ ml__ 3.0

The above ingredients were charged into a previously baked and cooled beverage bottle, which was then flushed with nitrogen and sealed with a silver-lined crown cap. The bottle was then placed in a polymerization cabinet at 50° C. for 16 hours. At the end of this time the bottle was removed and the polymer recovered as described in Example I. There was obtained 34.2 grams (95.8% conversion) of a rubbery polymer having a DSV of 15.5 and a gel percent of 39.75.

Example IV

Hexane _____ grams__ 89.1
Butadiene _____ do____ 32.0
Catalyst B–2 (Li:Fe=2:1; further aged at 70° C.
 for 24 hours) _____ ml__ 3 or 6

Two runs were made in accordance with the above recipe, one with 3 and one with 6 ml. of catalyst. In each case the reagents were charged, the polymerization conducted, and the polymer recovered as described in Example III. Following are particulars of the runs and of the resultant products.

TABLE III

| Run No. | Ml. of Catalyst | Yield | | DSV | Gel (percent) | Infra-red Analysis (percent) | | | |
|---|---|---|---|---|---|---|---|---|---|
| | | Grams | Percent | | | Cis-1,4 | Trans-1,4 | 1,2- | T. F. |
| 1 | 3 | 16.0 | 50.0 | 8.85 | 45 | 63.2 | 30.4 | 6.4 | 95.8 |
| 2 | 6 | 22.4 | 44.8 | 8.50 | 44 | 58.5 | 34.6 | 6.9 | 95.6 |

EXAMPLE V

| | | |
|---|---|---|
| Hexane | grams | 87.6 |
| Butadiene | grams | 33.1 |
| Catalyst B-1 (Li:Fe=1:1) | ml | 6.0 |

The above ingredients were charged into a polymerization bottle as described in Example III. The bottle was then placed in a polymerization cabinet at 50° C. for 21 hours, and the polymer recovered as described in Example I. There were recovered 30.2 grams (91.2% conversion) of a polymer having a DSV of 6.59 and exhibiting, by infra-red analysis, 45.1% cis-1,4, 47.2% trans-1,4 and 7.7% 1,2-unsaturation, the total found being 95.8%.

From the foregoing general discussion and detailed specific experimental examples, it will be seen that this invention provides a novel process for the polymerization of conjugated diolefins to yield products of improved microstructure and physical properties, particularly green strength and tack. The process is more readily controllable and reproducible than earlier processes based upon lithium compound catalysts, and the reactants employed are inexpensive and readily available.

What is claimed is:

1. Process of polymerizing a monomeric substance selected from the group consisting of conjugated diolefins containing up to six carbon atoms and mixtures thereof with each other and with up to 30%, based on the weight of the monomeric substance, of other unsaturated compounds copolymerizable therewith, which comprises contacting the same with a catalyst comprising a compound of the formula

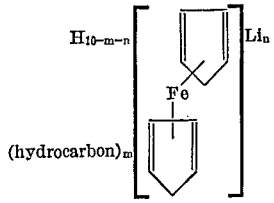

wherein
$m$ is an integer from 0 to 3
$n$ is an integer from 1 to (8-$m$)
and
(hydrocarbon) indicates a hydrocarbon group containing up to 10 carbon atoms 2. Process according to claim 1, wherein the monomeric substance is isoprene.

3. Process according to claim 1, wherein the monomeric substance is butadiene.

4. Process according to claim 1, wherein $M=0$ and $n$ is greater than 2.

5. A catalytic composition comprising a compound of the formula

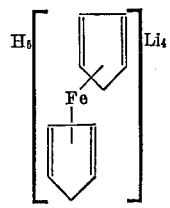

6. Process according to claim 1 wherein the catalytic compound has the formula

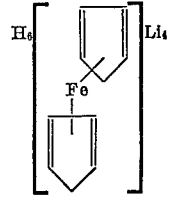

References Cited

UNITED STATES PATENTS 3,265,680  8/1966  Forman, et al. _____ 260—94.2

OTHER REFERENCES

J. Organic Chemistry, vol. 28, No. 3 (1963) pp. 850–851 relied on.

Canadian Journal of Chemistry, vol. 41, No. 5, May 1963 (pp. 1302–1303 relied on).

JOSEPH L. SCHOFER, *Primary Examiner.*

R. A. GAITHER, *Assistant Examiner.*